Dec. 26, 1939.   A. P. FERGUESON   2,184,294
VARIABLE RATIO BRAKE LEVER
Filed March 11, 1938   5 Sheets-Sheet 3
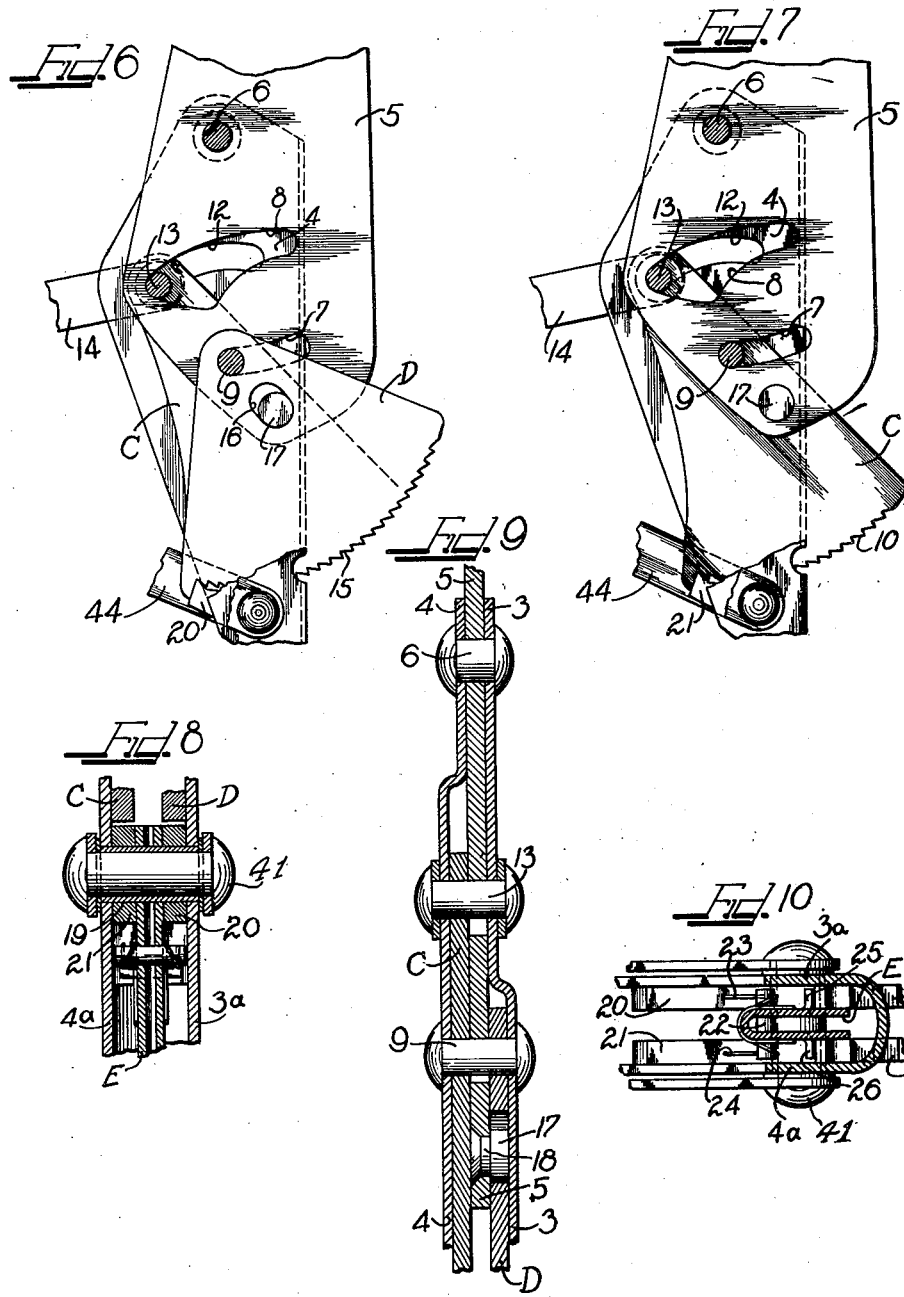

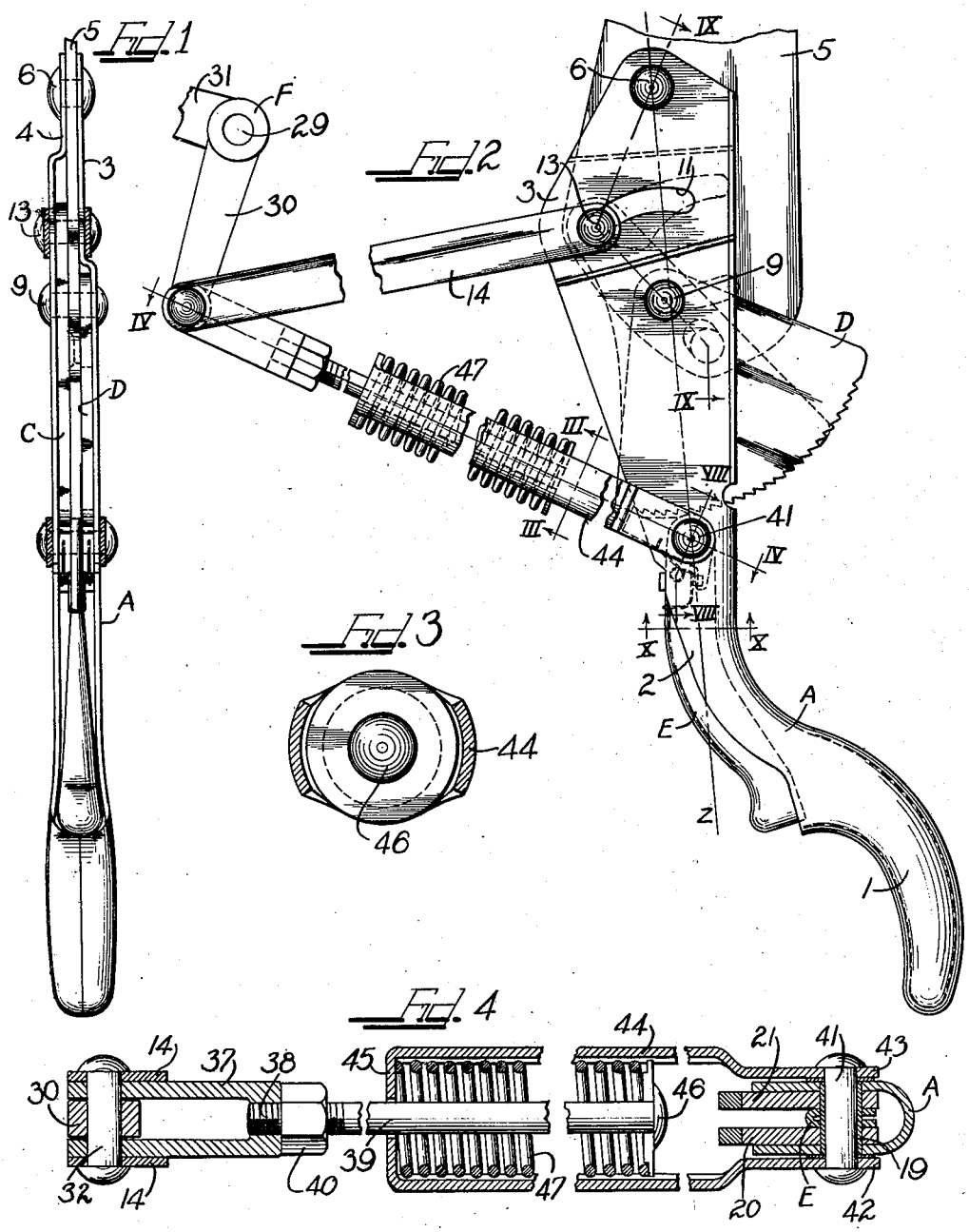

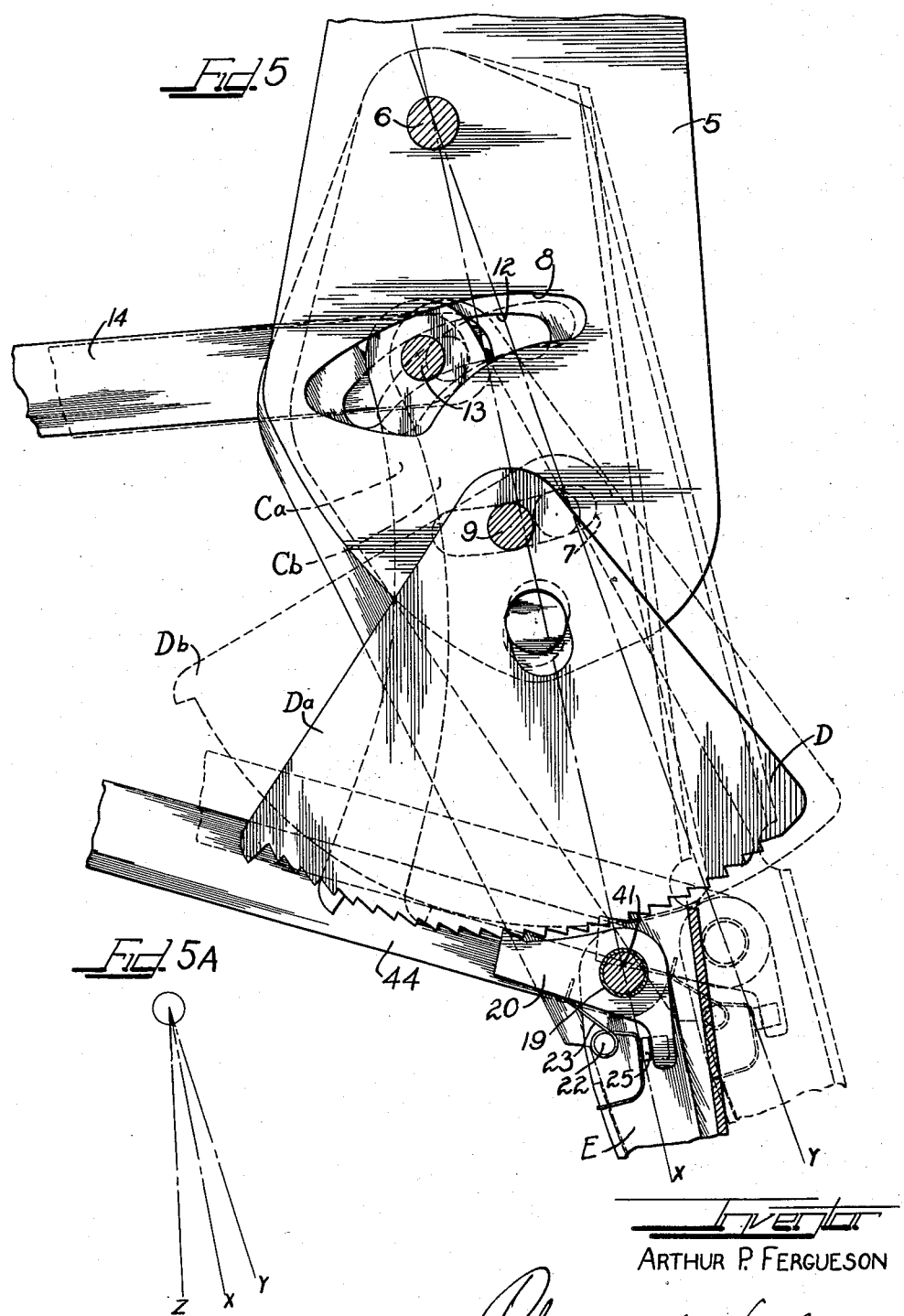

Dec. 26, 1939. A. P. FERGUESON 2,184,294
VARIABLE RATIO BRAKE LEVER
Filed March 11, 1938 5 Sheets-Sheet 4
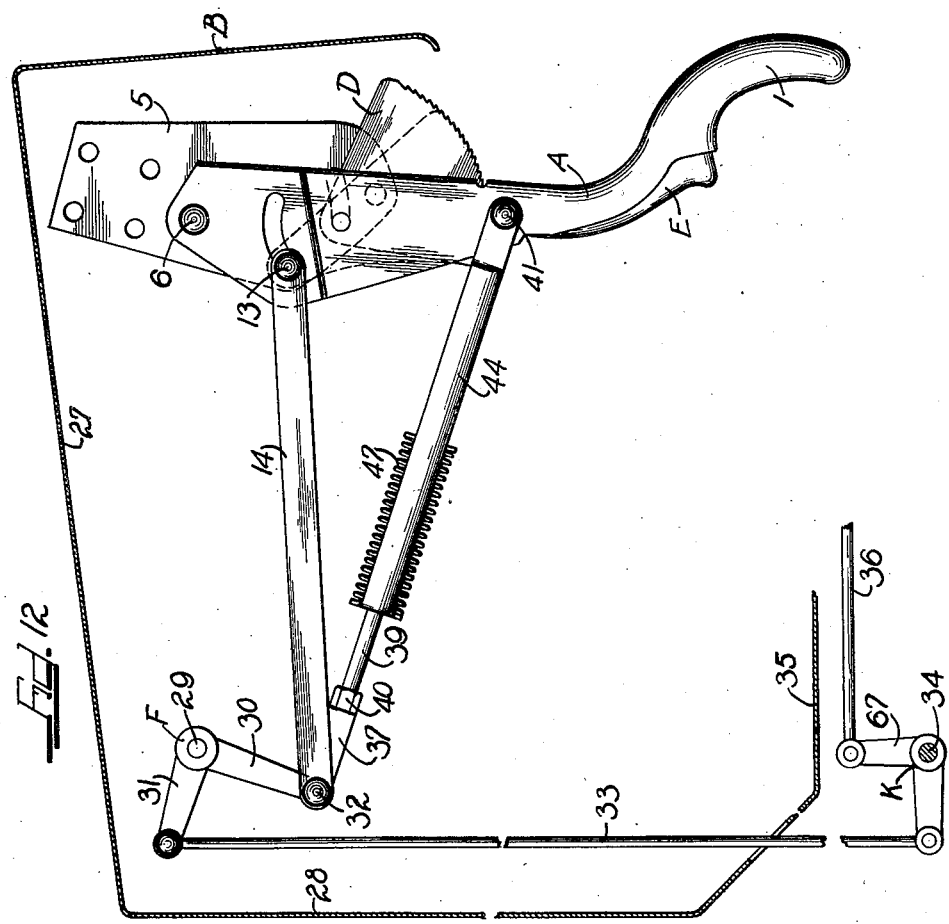
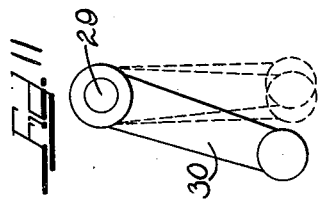
Inventor
ARTHUR P. FERGUESON
by Charles H. Hills Attys.

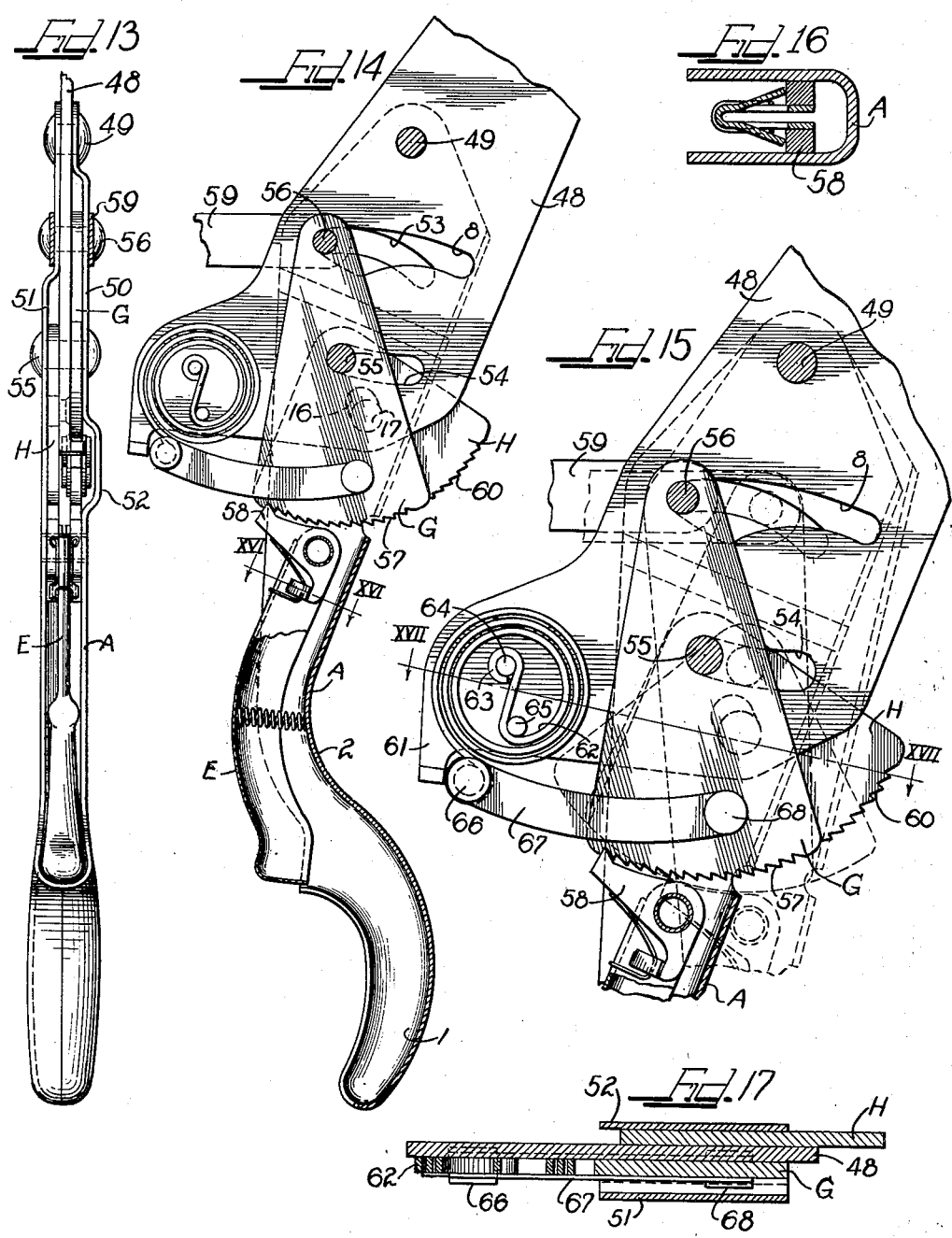

Patented Dec. 26, 1939

2,184,294

UNITED STATES PATENT OFFICE 2,184,294

VARIABLE RATIO BRAKE LEVER

Arthur P. Fergueson, Detroit, Mich., assignor, by mesne assignments, to Houdaille-Hershey Corporation, Detroit, Mich., a corporation of Michigan Application March 11, 1938, Serial No. 195,239

9 Claims. (Cl. 74—518)

The present invention relates to variable ratio brake lever construction and will herein be exemplified and described as an emergency brake lever construction for automotive vehicles.

Since the automotive vehicle manufacturers have changed the position of the emergency brake lever from the regular or standard mounting, that is, with the lower end of the lever secured to or adjacent the transmission casing with the lever extending upwardly through the floor board of the vehicle, to a position behind the instrument board, several practical problems have arisen.

In the first place, it is customary to install the brake lever of the dash or cowl type behind the instrument boards of the vehicles and adjacent the left-hand ends of the instrument boards and left-hand front doors for ready application by the left hands of the drivers. Because of the fact that such dash or cowl type levers are shorter in overall length than the regular types, the swing of a lever from "off" to "set" position is sometimes such as to cause the grip or handle portion of the lever to extend outwardly into the left-hand door opening when the lever is "set", thus interfering with the door opening and making it inconvenient for the driver to enter or leave the driver's seat of the vehicle.

The lever construction must be such that the amplitude of swing of the lever is sufficient to properly set the brakes and also to compensate for wear of the brake linings, in which event the amplitude of movement of the lever is increased. Another question involved is that of the slack of the brake mechanism which necessarily must exist, in order that the brake shoes be free of contact with the brake drums while the vehicle is in operation.

The brake lever of the present invention has for an object the provision of a construction wherein the ratio of pull imposed on the brake rigging, by movements of the lever from "off" to "set" position varies from low to high, with automatic shifting from the low to the high ratio, as the brake load increases.

It is an object of the present invention to provide an automotive vehicle emergency brake lever construction wherein one ratio of pull is imposed to take up the slack of the brakes on initiation of brake lever movement to set the brakes, and as the brake shoes engage the drum to increase the ratio for the purpose of setting the brakes with a minimum pulling effort applied to the lever.

Another object of the present invention is to provide an emergency brake lever construction for automotive vehicles wherein the movement of the brake lever may be reduced and at the same time the pulling effect increased.

A further object of the present invention is to provide a lever construction including a lever member and a brake mechanism element such as a cable or crank with plural connections between the crank and lever member united to the lever at different points in its length, wherein the pulling effect between the lever member and the crank is taken first by one connection and then automatically transferred to and taken by another of the connections, whereby the ratio or pull exerted is automatically increased.

A still further object of the present invention is to provide a brake lever construction wherein a variable pulling ratio is achieved between the lever and its connected brake mechanism to take up the slack of the brake mechanism at a low ratio of pull and to set the brakes with a higher ratio of pull.

The invention has for a further object the provision of an automotive vehicle emergency brake lever construction of such character that the pulling effort imposed on the lever, as the latter is swung in brake applying direction, is applied to the lever, first at one point in its length, for taking up slack at a low ratio, and then at another point, nearer the lever pivot, for effecting final clamping action of the brake shoes against the brake drums at a higher ratio, to set the brakes, whereby full braking may be accomplished with a reduction of amplitude of swing of the lever.

Generally speaking, the present invention contemplates a lever member pivoted to swing in the usual manner. An oscillating arm or sector is pivoted between its ends to the lever at a distance from the lever pivot. A connection from the brake mechanism is made to the end of the arm or sector nearer the lever pivot. Means are provided for causing a rapid take-up of the brake connection, by swinging the arm or sector on its pivot, to take up slack. Then, when the brake resistance reaches an amount in excess of that present during the taking up of the slack, movement of the arm or sector is checked and the pull is then between said one end of the arm or sector and the brake mechanism; that is to say, at a point nearer the lever pivot. The pull, during the initial lever movement to take up slack is applied to the lever at a point farther from the lever pivot. The change of point of application of pull to the lever, first at one point and then at another point nearer the lever pivot, is automatically made.

The above, other and further objects of the present invention will be apparent from the following description and accompanying drawings.

The accompanying drawings illustrate embodiments of the present invention, and the views thereof are as follows:

Figure 1 is an edge elevational view of a brake lever constructed in accordance with one form of the present invention;

Figure 2 is a side elevational view of the brake lever of Figure 1, with parts broken away, and showing plural connections between the lever and an operating crank which is part of the brake mechanism;

Figure 3 is an enlarged transverse sectional view, taken substantially in the plane indicated by the line III—III of Figure 2;

Figure 4 is an enlarged, fragmental, longitudinal view, taken substantially in the plane indicated by the line IV—IV of Figure 2;

Figure 5 is a fragmental elevational view, with parts in section, showing the relative action of certain of the elements of the mechanism, and showing in full lines the position of the parts occupied by the elements when the lever has been swung to take up the slack in the brake mechanism and move the shoes against the brake drums, and in dotted lines the position of the parts as the lever is swung to final position, to set the brakes;

Figure 5a is a diagrammatic view, showing the differences of angular movement of the lever member as the lever is illustrated in Figures 2 and 5;

Figure 6 is a fragmental elevational view, with parts removed, showing details of construction and operation of the floating sector and pawl utilized to latch the brake in adjusted position;

Figure 7 is a view similar to Figure 6, showing a swinging or floating arm or sector, to the upper end of which is connected a connection from the crank;

(Figures 6 and 7 show the parts when the brake lever member is in "off" position, that is, as shown in Figure 2);

Figure 8 is an enlarged fragmental view, taken substantially in the plane indicated by the line VIII—VIII of Figure 2;

Figure 9 is an enlarged sectional view, taken substantially in the plane indicated by the line IX—IX of Figure 2;

Figure 10 is an enlarged sectional view, taken substantially in the plane indicated by the line X—X of Figure 2;

Figure 11 is a diagrammatic view, showing the positions occupied by the crank of the brake mechanism corresponding with the positions of movement of the lever member and occupying the angular positions illustrated in Figure 5a, and which is also the positions of the lever member as shown in Figures 2 and 5;

Figure 12 is a somewhat diagrammatic view, in elevation and in section, showing the manner of mounting the brake lever behind the instrument panel of an automotive vehicle and the manner of connecting it to the brake mechanism of the vehicle, the lever being shown in "off" position, which is that of Figure 2;

Figure 13 is an edge elevational view of another form of brake lever of the present invention;

Figure 14 is a view, partially in elevation and partially in section, of the lever of Figure 13, showing the parts with the lever in "off" or normal position;

Figure 15 is a fragmental view, partially in elevation and partially in section, of the lever of Figures 13 and 14, showing in full lines the position of the parts with the lever in "off" position, and in dotted lines the position of the parts as the lever has been swung to take up slack of the brake mechanism immediately prior to the final braking action;

Figure 16 is an enlarged, transverse sectional view, taken substantially in the plane indicated by the line XVI—XVI of Figure 14; and Figure 17 is a transverse section on the line XVII—XVII of Figure 15.

The drawings will now be explained.

The brake lever member, herein designated generally as A, is illustrated as fashioned as a stamping with a curved, closed hollow grip portion 1, an intermediate or shank portion 2, which is channel-shaped, and a fulcrum end comprising legs 3 and 4 which are laterally spaced to straddle a supporting plate 5 with the upper ends suitably apertured to take a pivot 6 for pivotally connecting the lever member A to the supporting plate 5.

The plate 5 is suitably secured by bolts or rivets to a proper foundation, not shown, which is applied behind the instrument panel B of the vehicle. Below the pivot 6, the supporting plate 5 is formed with an arcuate slot 7 struck from the center of the pivot 6. Between the pivot 6 and the arcuate slot 7, another slot 8 is fashioned in the supporting plate 5, with its upper margin struck on a radius from a center which is the axis of a pivot pin 9 to be hereinafter more fully described.

The pin 9 passes through the slot 7 and is secured in the legs 3 and 4 of the lever member A. Pivoted on the pin 9 between one side of the supporting plate 5 and the adjacent leg 4 of the fulcrum end of the lever member is a rocking or floating arm or sector C with its upper end overlying the slot 8 in the plate 5 and its lower end formed with an arcuate margin provided with ratchet teeth 10, the ratchet teeth being on the opposite side of the pivot pin from the upper end of the sector.

Formed in the legs 3 and 4 of the lever member are arcuate slots 11 and 12, respectively, struck from the center of the pin 9 and in register with the irregularly shaped slot 8 in the plate 5. A pivot pin 13 passes through the slot 8 in the plate 5 and the slots 11 and 12 in the lever member, and has attached to it rigid linkage 14. Pivoted on the pin 9 between the other face of the plate 5 and the leg 3 of the lever member is a second floating sector D having an arcuate margin provided with ratchet teeth 15.

The arcuate margin of the floating sector C carrying the ratchet teeth 10 and the arcuate margin of the floating sector D carrying the ratchet teeth 15 are concentrically arranged with respect to the pivot pin 9. The floating sector D is provided with an elongated slot 16, as shown clearly in Figure 6, into which enters the head 17 of a pin 18 suitably fastened in an aperture in the supporting plate 5.

Below the arcuate margins of the floating sectors, the lever member is apertured for receiving a bushing 19 on which are oscillatably mounted pawls 20 and 21 for engagement respectively with ratchet teeth 15 of the sector D and ratchet teeth 10 of the sector C. Oscillatably supported on the bushing 19 and extending downwardly therefrom, as illustrated in the drawings, is a pawl release member E, herein shown as comprising a stamping of U-shape in section and assembled within the shank portion 2 of the lever member A to protect outwardly of said shank in position to be grasped by the forefinger of an operator to disengage the pawl from the floating sectors to return the lever member to "off" position, after having been moved to "set" position.

Adjacent the pawls 20 and 21, the release member E carries a pin 22 extending beyond its side surfaces (Figure 10). Carried on one end of this pin and outwardly of the release member E is a spring 23 which engages the pawl 20 to normally maintain it in latched engagement with the floating section D. Similarly, surrounding the other end of the pin and outwardly of the release member E is a spring 24 connected to the pawl 21 to normally maintain it in latched engagement with the floating sector C. The springs engage against the release member E with such action as to maintain the pawls normally in latched engagement with the floating sectors C and D and the release member E in normal or extended position, as shown in Figure 2.

The release member E carries two lugs 25 and 26 for contacting respectively the tails of the pawls 20 and 21 to unlatch the pawls from the ratchet teeth of their respective sectors. Preferably, the lugs 25 and 26 are struck up out of the side walls of the release member, as indicated in dotted lines in Figure 5.

Referring to Figure 12, the instrument board B is formed as an integral part or as a separate part of the cowl 27, which cowl extends forwardly to the dashboard or fire wall 28 separating the motor compartment from the front or driver's compartment of the vehicle. Suitably supported in bearings, not shown, is a stub shaft 29 carrying a bell crank member F with two arms 30 and 31. The arm or crank 30 is connected to the linkage 14 by means of a suitable pivot pin 32, while the arm 31 is suitably connected by a rod 33 with another bell crank K supported on a suitable shaft 34 mounted below the floor boards 35 of the vehicle, and to which bell crank is connected a cable or rod 36 to the brake rigging of the vehicle.

Pivoted to the pin 32 is a clevis 37 having the threaded end 38 of an elongated rod 39 secured to it and locked in adjusted position by means of a lock nut 40. A pivot pin 41 passes through the bushing 19 and pivotally connects to the lever member A, the ends 42 and 43 of a U-shaped elongated strap 44. The end of the strap remote from the pivot 41 is apertured to receive the rod 39. Between the looped end 45 of the strap 44 and the head 46 of the rod 39 is a spring 47.

The connections between the crank 30 and the lever member A just described is united to the brake lever member A by the pivot pin 41 remote from the pivotal connection 6 of the lever to the supporting plate 5, so that as the lever A is swung in brake-applying position, the power application is at a relatively low ratio, approximately 2 to 1.

The spring 47 is a low capacity spring so designed as to tend to move the crank 30, by means of the elongated rod 39, during such amplitude of movement of the brake lever member A as will take up the slack of the brake mechanism and move the brake shoes against the brake drums.

The operation of this form of the brake lever of the present invention is as follows:

In Figures 2, 6, 7 and 12, the lever is shown in its "off" position, with the various elements of the mechanism occupying their normal or "off" positions. When the lever member is swung in brake-applying direction, which is counterclockwise, the connections comprising the strap 44, spring 47, rod 39 and clevis 37, between the crank 30 and the pivot 41 of the brake lever, swing the crank 30 in counter-clockwise direction. This movement moves the linkage 14 to the right, thereby swinging the floating sector C is clockwise direction about its pivot 9. This swinging movement of this sector moves some 15 of its ratchet teeth 10 past the pawl 21.

As soon as the brake shoes contact the brake drums, load is put on the brake mechanism, thereby restraining movement of the bell crank F in clockwise direction. Such restraint, through the linkage 14, tends to swing the floating sector C in counter-clockwise direction. However, this tendency to swing is checked by engagement of the pawl 21 with the ratchet teeth 10 of this sector, thus locking the sector against such retrograde movement and, in effect, making the latched sector C, for the moment, an integral part of the lever member. The pull exerted by the brake lever A on the crank 30 under these conditions transfers this pull to the pivot 13 at the upper end of the arm or sector C, that is, to a point nearer the lever pivot, thus increasing the ratio and enabling application of the brakes with a minimum of travel of the brake lever.

When the brake lever has been swung far enough to set the brakes, the pawl 20 latches with its floating sector D to thus secure the lever in adjusted position. The pivot 13, to which the linkage 14 is connected, may be said to be a traveling pivot or floating pivot, which moves during the interval of time when there is substantially no load on the crank 30 and which becomes fixed when load is imposed on the crank 30 over and above that necessary to move the brake shoes against the drums.

To release the brakes, the operator actuates the release member E which trips both of the pawls 20 and 21, thereby unlatching the lever and enabling its return to "off" position in the usual manner. During such return to normal position, the floating sectors C and D swing in counter-clockwise direction to the positions seen in Figures 6 and 7.

The fact that the floating sector D is pivoted at 9 and is engaged by the head 17 of the pin 18 causes a rocking movement of this sector about its pivot in such manner as to move the ratchet teeth 15 past its pawl 20 at a greater rate of speed than that of the angular movement of the lever member, so that a very fine adjustment may be secured to latch the lever in "set" position.

Referring to Figure 5, the full line position of the parts represents the arrangement of the same at the moment the brake shoes have been moved against the brake drums, and the load is being transferred from the lower connection to the upper connection. By the upper connection, is meant the linkage 14, and the lower connection is that comprising the strap 44, spring 47, rod 39 and clevis 37.

The dotted line position of the parts in Figure 5 represents the position occupied when the lever has been swung to fully set position, when the brake shoes are new. As the brake shoes wear, a greater amplitude of swing of the lever will follow, until such time as the shoes have to be renewed.

Referring to the form of the invention illustrated in Figures 13 to 17, inclusive, such parts as correspond to the parts of the first form of the invention heretofore described carry the same reference characters.

A support or plate 48 is suitably fastened at its upper end, not shown, in position behind the instrument board B of an automotive vehicle. The lever A is pivoted to this support at 49 and has a handle portion 1, a shank portion 2 and a fulcrum portion including legs 50 and 51. The leg 50 is bulged at 52 for a purpose to be later described. The upper ends of the legs are suitably bent to engage opposite faces of the plate 48 to receive the pivot pin 49, as illustrated in Figure 13.

The legs 50 and 51 of the lever are provided with arcuate slots 53. The plate 48 is provided with an arcuate slot 54 struck on a radius through the center of the pin 49, which slot is arranged in the plate below the pivot 49. A pivot pin 55 passes through registering apertures in the legs 50 and 51 of the lever and through the slot 54 of the plate 48. Swingable on this pin 55, between one face of the plate 48 and the leg 50 of the lever, is an oscillatable arm or sector G, whose upper end carries a pivot pin 56 working in the slots 53 of the lever legs and passing through a slot 8 in the plate 48, of the same general character and arrangement as the slot 8 of the plate 5 of the first form of the invention.

The lower end of the sector G is arcuate and is provided with ratchet teeth 57, with which a pawl 58 cooperates for latching the arm or sector G against retrograde movement. Connected to the pin 56, at the upper end of the arm of sector G, is rigid linkage 59 which is connected at its other end, not shown, to a brake mechanism element, such, for example, as the crank 30, or to a cable leading to the brake mechanism of the vehicle below the floor boards.

Pivoted on the pin 55, between the opposite face of the plate 48 and the leg 51 of the lever, is a sector H having an arcuate margin provided with teeth 60, with which a pawl, similar to the pawl 58, engages to latch the lever in adjusted position. This sector is of the same form and construction as sector D of the first form, and is provided with an elongated slot 16 which receives the head 17 of a pin of the character heretofore described.

The plate 48 has a tail portion 61, on one face of which is mounted a spiral or door-lock spring 62 having one of its ends 63 engaging a post 64 in the plate, with a portion of the spring bent about a pin 65 adjacent the post 64. The other end of the spring is connected to a post 66 at one end of a curved link 67, the other end of the link being pivoted at 68 to the oscillatable arm or sector G, as illustrated in Figures 14 and 15.

In this form of the invention, the operation is as follows:

The lever is shown in Figure 14 in "off" position. When the lever is moved in brake-applying position, it swings in counter-clockwise direction, as viewed in Figures 14 and 15. Because of the resistance offered by the spring 62, the lower end of the arm or sector G is held, causing its upper end, with the pivot 56 and the connected linkage 59, to move to the right, as viewed in Figures 14 and 15, with the lower or ratchet end of the sector moving freely over the pawl 58. When the brake resistance equals or overbalances the effect of the spring 62, there arises a tendency of the arm or sector G to swing in retrograde direction. However, such tendency is checked by engagement of the pawl 58 with a ratchet tooth of the sector, so that the sector becomes a unit with the lever, and the whole structure, that is, the lever and the sector G, moves as a unit, tightening the spring 62 and exerting sufficient pull on the linkage 59 to set the brakes.

During such movement, the sector H swings in clockwise direction until the brakes are set, whereupon its pawl engages it to thus latch the lever in adjusted position. To release the lever, the actuating member E is operated, thus unlatching the pawls from engagement with the sectors G and H and returning the lever to "off" or normal position in the usual manner.

As soon as the pull on the linkage 59 becomes less than the effect of the spring 62, during return to normal position, the spring 62 swings the arm or sector G to the full line position of Figures 14 and 15, ready for another cycle of movement.

In this form of the invention, during the time that the slack of the brake mechanism is being taken up, which is accomplished by swinging of the sector G on its pivot 55, the load may be said to be connected to the lever at the axis of the pivot 55. When the brake resistance overcomes the effect of the spring 62, and the tendency of the sector to swing in retrograde direction is checked by its pawl 58, the connection of the brake mechanism to the lever may then be said to be at the axis of the pin 56 at the upper end of the sector G, that is, at a point nearer the lever pivot 49 than when the load is connected to the lever through the axis of the pin 55.

In this manner of actuation, variable pulling ratios are achieved, the lower ratio being used to take up the slack, and the higher ratio to effectively set the brakes with a minimum amount of lever travel.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Control mechanism including a lever pivoted to swing, an arm pivoted between its ends to said lever for swinging movement about its pivot, a load element, a rigid link connection between said load element and the end of the arm nearer the lever pivot and pivoted at one end to said arm, spring means of limited capacity operative for swinging said arm in angular direction counter to the direction of swing of the lever on initiation of lever movement until resistance of the load element balances said spring which occurs at an intermediate point in the swing of the lever in one direction, means engaging said arm to prevent retrograde swing thereof when the load resistance overbalances said spring, the engagement of said means with said arm fixing the position of said arm with respect to the lever for travel in said fixed position during the balance of travel of the lever in said direction thereby establishing the point of application of pull of the load connection to said lever as at the point of connection of said link connection with said one end of said arm, the construction being such that the point of application of pull between said load element and said lever is elsewhere than at the said end of said arm during the interval the arm is being swung by said spring.

2. Control mechanism including a lever pivoted to swing, an arm pivoted between its ends to said lever for swinging movement about its pivot, a load element, a rigid connection between said load element and the end of the arm nearer the lever pivot, spring means of limited capacity connected indirectly for swinging said arm in angular direction counter to the direction of swing of the lever on initiation of lever movement until resistance of the load element balances said spring which occurs at an intermediate point in the swing of the lever in one direction, means engageable with said arm to prevent retrograde swing thereof when the load resistance overbalances said spring, the engagement of said means with said arm fixing the position of said arm with respect to the lever for travel in said fixed position during the balance of travel of the lever in said one direction thereby establishing the point of application of pull of said connection to said lever as at said one end of said arm, the construction being such that the point of application of pull between said load element and said lever is elsewhere than at the said end of said arm during the interval the arm is being swung by said spring.

3. Control mechanism including a lever pivoted to swing, an arm pivoted between its ends to said lever for swinging movement about its pivot, a load element, a connection between said load element and the end of said arm nearer said lever pivot, spring means of limited capacity connected directly for swinging said arm in angular direction counter to the direction of swing of the lever on initiation of lever movement until resistance of the load element balances said spring which occurs at an intermediate point in the swing of the lever in one direction, means engageable with said arm to prevent retrograde swing thereof when the load resistance overbalances said spring, the engagement of said means with said arm fixing the position of said arm with respect to the lever for travel in said fixed position during the balance of travel of the lever in said one direction thereby establishing the point of application of pull of said connection to said lever as at said one end of said arm, the construction being such that the point of application of pull between said load element and said lever is elsewhere than at the said end of said arm during the interval the arm is being swung by said spring.

4. Control mechanism including a lever pivoted to swing, an arm pivoted between its ends to said lever for swinging movement about its pivot, a load element, a rigid connection between said load element and the end of said arm nearer said lever pivot, spring means of limited capacity connected between the load element and said lever for swinging said arm in angular direction counter to the direction of swing of said lever on initiation of lever movement until resistance of the load element balances said spring which occurs at an intermediate point in the swing of the lever in one direction, means engageable with said arm to prevent retrograde swing thereof when the load resistance overbalances said spring, the engagement of said means with said arm fixing the position of said arm with respect to the lever for travel in said fixed position during the balance of travel of the lever in said one direction thereby establishing the point of application of pull of said connection to said lever as at said one end of said arm, the construction being such that the point of application of pull between said load element and said lever during the interval the arm is being swung by said spring is at the point of connection between said connection and said lever.

5. Control mechanism including a lever pivoted to swing, an arm pivoted between its ends to said lever for swinging movement about its pivot, a load element, a rigid link connection between said load element and the end of the arm nearer the lever pivot and pivoted at one end to said arm, spring means of limited capacity operative for swinging said arm in angular direction counter to the direction of swing of the lever on initiation of lever movement until resistance of the load element balances said spring which occurs at an intermediate point in the swing of the lever in one direction, means engaging said arm to prevent retrograde swing thereof when the load resistance overbalances said spring, the engagement of said means with said arm fixing the position of said arm with respect to the lever for travel in said fixed position during the balance of travel of the lever in said direction thereby establishing the point of application of pull of said connection to said lever as at the point of connection of said link with said one end of said arm, the construction being such that the point of application of pull between said load element and said lever is farther from the lever pivot than the distance from said lever pivot to the nearer end of said arm during the interval the arm is being swung by said spring.

6. An automotive emergency brake lever construction including a mounting member, a lever member pivoted to said mounting member to swing, a brake mechanism element such as a crank, a sector pivoted to said lever to rock and having an arcuate margin provided with ratchet teeth and having an end portion opposite the sector pivot from said teeth and adjacent the lever member pivot, a rigid connection between said crank and said end of said sector, a second connection between said crank and said lever joined to the lever at a point farther from the lever pivot than the junction of said rigid connection with said sector end, said second connection including a spring of limited capacity, a pawl pivoted to said lever member engageable with the ratchet of said sector, a second sector pivoted to said lever member and having ratchet teeth along an arcuate margin, a second pawl pivoted to said lever member engageable with the ratchet of said second sector to hold said lever member in adjusted position, and a release member pivoted to said lever member for disengaging said pawls from said ratchets, the construction being such that on movement of said lever member to set the brakes, initial movement of said crank is effected by said second connection until the capacity of the spring is reached whereupon the pulling effect is automatically transferred to said rigid connection to said sector for completing the brake movement.

7. An automotive emergency brake lever construction including a mounting member, a lever member pivoted to said mounting member to swing, an oscillatable member pivoted between its ends to said lever member and having one end terminating adjacent the lever member pivot and the other end formed with an arcuate margin provided with ratchet teeth, a load element joined to said one end of said sector by a rigid connection, a spring of limited capacity connected to said oscillatable member near said arcuate margin, a pawl engageable with the ratchet teeth of said sector for latching said sector against swinging movement in one direction, the construction being such that the point of application of pull between said load element and said lever is transmitted to the lever through the sector pivot until the brake resistance overcomes the capacity of the spring whereupon said sector becomes latched to said lever transferring the pulling effect to the said end of said sector adjacent the lever pivot.

8. An automotive emergency brake lever construction including a mounting member, a lever member pivoted to said mounting member to swing, two sectors coincidentally pivoted to said lever member and having concentric arcuate margins provided with ratchet teeth, one of said sectors having an end terminating near the lever member pivot, a load element joined to said one end of said sector by a rigid connection, two pawls coincidentally pivoted to said lever member in position to engage the teeth of said sectors, and means secured to said mounting member and engaging said one sector to rock said one sector as the lever is swung, said means rocking said sector in a direction counter to the direction of lever swing.

9. An automotive emergency brake lever construction including a mounting member, a lever member pivoted to said mounting member to swing, two sectors coincidentally pivoted to said lever member and having concentric arcuate margins provided with ratchet teeth, one of said sectors having an end terminating near the lever member pivot, two pawls coincidentally pivoted to said lever member in position to engage the teeth of said sectors, a load element, a rigid connection between said load element and the said one end of said one sector, means secured to said mounting member and engaging said one sector to rock said one sector as the lever is swung, said rocking movement of said sector being in a direction counter to the direction of swing of said lever, a spring of limited capacity operatively connected to said one sector, the construction being such that on initiation of movement of the lever in brake-setting direction movement of the load element is occasioned by the rock of said sector under spring action until the brake load overbalances the spring capacity whereupon the sector becomes latched to said lever thereby completing the pull of the brake mechanism to the rigid connection to the said one end of said sector, and means for restraining said one sector against retrograde movement when the brake load overbalances the capacity of said spring.

ARTHUR P. FERGUESON.